(12) United States Patent
Yakubov et al.

(10) Patent No.: US 12,321,329 B2
(45) Date of Patent: Jun. 3, 2025

(54) SYSTEM PROVIDING FOR USER INITIATED PLATFORM OPERATIONS ON A NETWORK-BASED PUBLIC ACCESS FILE DATABASE

(71) Applicants: Ariel Yakubov, Manalapan, NJ (US); Roman Zelichenko, Kew Gardens, NY (US)

(72) Inventors: Ariel Yakubov, Manalapan, NJ (US); Roman Zelichenko, Kew Gardens, NY (US)

( * ) Notice: Subject to any disclaimer, the term of this patent is extended or adjusted under 35 U.S.C. 154(b) by 65 days.

(21) Appl. No.: 18/139,807

(22) Filed: Apr. 26, 2023

(65) Prior Publication Data
US 2024/0362198 A1    Oct. 31, 2024

Related U.S. Application Data

(63) Continuation of application No. 16/794,215, filed on Feb. 18, 2020, now Pat. No. 11,676,110.

(60) Provisional application No. 62/806,980, filed on Feb. 18, 2019.

(51) Int. Cl.
*G06F 16/22* (2019.01)
*G06F 16/23* (2019.01)

(52) U.S. Cl.
CPC ...... *G06F 16/2291* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 2003/0046287 A1* | 3/2003 | Joe | G06Q 50/26 |
| 2011/0022531 A1* | 1/2011 | Jordan | G06Q 10/1053 705/321 |
| 2013/0041703 A1* | 2/2013 | Ganji | G06Q 10/10 705/7.11 |

* cited by examiner

*Primary Examiner* — Kannan Shanmugasundaram

(57) ABSTRACT

A system providing for user-initiated, account-type limiting, association-limiting, and duration-dependent public access file disclosures over a semi-private network.

20 Claims, 15 Drawing Sheets

SYSTEM PROVIDING FOR USER INITIATED PLATFORM OPERATIONS ON A NETWORK-BASED PUBLIC ACCESS FILE DATABASE

PRIORITY CLAIM

This application claims the benefit and priority of U.S. non-provisional application Ser. No. 16/794,215, filed Feb. 18, 2020, which in turn claims the benefit and priority of U.S. provisional patent application 62/806,980, filed Feb. 18, 2019. The above referenced applications are incorporated herein by reference as if restated in full.

BACKGROUND

In order to hire an H-1B, H-1B1 or E-3 worker, a Labor Condition Application (LCA) has to be filed with the United States Department of Labor (DOL). Part of the requirements for an employer to remain compliant with applicable DOL regulations is to give official notice to employees of the intentions to hire a foreign worker. Typically this notice is done by printing the LCA and posting it at a general public location of the employer worksite. The notice needs to be up for up to 10 days, monitored during this time period, and documented for the days it's been up. Once the notice is removed, it is stored in a Public Access File (PAF), maintained for a period of time, and must be made accessible to the public of government officials in the event of an audit. Standard practice among law firms, staffing companies, and general employers is to print and post a hard copy LCA notice and create and store hard copy PAFs.

This practice is time consuming, and in order to comply with exacting federal regulations designed to preserve the security of documentation and to facilitate specificity of protocol access, requires the maintenance and transport of paper documents and coordination between the employer, law firm and applicant. What is needed is a system for providing user initiated operations complying with federal regulations, capable of controlling the process in a manner which prevents artificial or fraudulent manipulations of public access file content and lifecycle parameters, and a portal providing secure access enabling both for electronic governmental verifications of those parameters as well as law firms submitting, tracking, maintaining, and withdrawing the public access files in an automated process supporting individuated control.

SUMMARY

In an extremely broad view the platform comprises a set of algorithms and databases coupled to a user interface. But the nature of the algorithms and their interaction with the databases and with the user through the user interface provides a significant technical solution to a technical problem, as will be shown and discussed.

In one embodiment, the platform provides for the creation of user accounts and the storing of user account information in a user account database. The platform may provide a user interface enabling a user to sign up for a user account by sending one or more articles of information to the platform, such as the user's first and last name, a user name, a password, and one or more security questions and/or answers to those security questions. The platform may add a user account to the user account database, and associate these articles of information with that user account. In one aspect of this embodiment, user accounts are created for users by information provided by an operator; upon receiving login credentials from the operator, the user is able to access the platform.

In another embodiment, users may be assigned a UserClass by the platform or an operator thereof. The UserClass may be determined based on one or more of the articles of information provided to the platform by the user. In another embodiment, a user may assign himself or herself a UserClass. Based on the UserClass, a user may be permitted or denied various interactions with the platform, as will be discussed. Examples of UserClasses include Administrator, Staff, Customer, Petitioner, Client, and Auditor.

The Administrator UserClass is given permission to view and edit via the Administrator Window. The Administrator can view, edit, initiate, and delete any StateFile, State, TimeStamp, TimeDuration, or report.

The Staff UserClass is given permission to view and edit via the Staff Window. The Staff is given permission to update customer accounts and renew memberships.

The Customer UserClass is given permission to view and edit via the Customer Window. The Customer is given permission to view, edit, post, and take down StateFiles belonging to the PetitionerClass the Customer is associated with via an OrganizationClass.

The Auditor UserClass is given permission to view and edit via the Auditor Window.

A PetitionerClass represents a legal entity which owns StateFiles.

A UserClass is associated with an PetitionerClass and an OrganizationClass. An OrganizationClass represents an account group which contains a list of PetitionerClasses. Each UserClass must belong to an OrganizationClass which grants it permission/association to read/write StateFiles for PetitionerClasses.

The platform provides for the creation of a StateFile and a StateFile database, in which StateFiles and their associated states are saved, accessed, and modified. The StateFile, which may encompass active documents such as a Labor Condition Application (LCA), may be configured to receive an LCA Number, a petitioner name identifier, a job title, a posting location including such details as the city and state of the open position(s), and the number of positions.

In one embodiment, StateFiles in the StateFile database may be parsed through various keyword searches, tag selections, and/or column and row titles arrangements. Keywords, tags, and titles may include: location, job title, and petitioner, case number, posted date, salary, and client site.

The StateFile may be designated by the platform as having one or more states, including opened, live, completed, denied, and withdrawn. This designation may occur by virtue of the one or more elements of the StateFile being completed, when the present date matches a date set in the StateFile, or upon initiation by a user or operator of the platform. If and when a StateFile is designated with a given state, the platform creates a time stamp for that state. For example, if a StateFile is designated with an open state, an opened time stamp is created and associated with the StateFile. If the StateFile is then designated with a live state, a live time stamp is created and similarly associated. Time stamps are saved in the StateFile database and accessed, at least, by viewing the StateFile on a dashboard.

In one embodiment of a StateFile withdrawal action, A user unposts an LCA earlier than 10 days after it was originally posted. The system may automatically tag that LCA as withdrawn in the system and it is moved into the "Archived" section rather than the "Completed" section. In another embodiment, a user manually hits the "withdraw"

button on a previously "Completed" LCA, which tags that LCA as "withdrawn" and moves it into the archived section.

In one variation, when an LCA is posted initially, it becomes "Live" and then after 10 days it is "unposted" either manually or via an automated method, which makes the PAF Completed. In another variation, when an LCA is posted initially, it becomes live but the then is "unposted" after fewer than 10 days, it is automatically marked as "withdrawn" and is moved into the "Archived" section. As a permutation of (2), when a PAF has been completed (meaning that LCA was "Live" for more than 10 days), but the user goes into edit the PAF and click "withdraw," the PAF is then re-tagged as "Withdrawn" and moved into the Archived section. However, in this instance it is not being unposted as it was already not posted.

In one embodiment, the platform creates state durations, which tracks the time duration a StateFile maintains a designated state. For example, if a StateFile is designated a live state, a live duration is created and set to the duration of time during which the StateFile is in the live state. In one variation, the state duration continues to track the StateFile even after it is designated another state. In another variation, the state duration is frozen after the StateFile is designated another state.

In one embodiment, the state duration and/or time stamp is set by an Administrator user or determined by the platform, and cannot be modified by any other user type.

When the state of a StateFile is changed, the platform may alert one or more relevant users of the change. In one embodiment, StateFiles can only be modified by User-Classes designated by the platform as permitted to modify. Permissions may be dependent on the state of the StateFile. For example, while an Administrator may be permitted to modify a StateFile whether it is open, live, completed, denied, or withdrawn, the Customer may only modify when the StateFile is open, but cannot modify it thereafter.

A StateFile in an opened state has been created in the StateFile database and its elements may therein be saved. If the platform designates or determines that the StateFile is in a live state, then the data of the StateFile is converted to display data, transmitted to one or more local computers, and may be displayed in a website user interface such as a browser or other dedicated public display portal. The url on which the display data is associated and on which it is displayed may be determined by the platform through a computation of one or more StateFile elements or set by a user or operator of the platform.

A StateFile in a completed state has been displayed for a set duration, the set duration being selected by a user or operator or pre-set by the platform. Display data associated with a StateFile in a complete state may be deleted from the StateFile database, removed from the website user interface and no longer displayed thereon, no longer transferred to local computers, and/or modified to reflect the completed state.

A StateFile in a denied state has been designated as rejected by a user with the appropriate UserClass permission, such as an Auditor. When a StateFile has been rejected, it is also withdrawn.

A StateFile is in a withdrawn state when it has been either denied, as described above, removed from display in less than ten days since it was first selected for display, or simply designated as such by a user with the appropriate UserClass permission, such as a Customer in respect to a StateFile he initiated.

In one embodiment, users access and modify StateFiles through private organizational portals, and the private organizational portals then transmit updates to the platform StateFile database. In this embodiment, the updates may be pending before being saved to the database, waiting approval by a platform operator. In another embodiment, users access and modify StateFiles directly in the StateFile database through the platform.

In one embodiment, users can change the state of a StateFile from open to live by sending a post request through a private organizational portal and/or to the platform. Users can change the state from live to withdrawn using a similar step.

In one embodiment, users may submit additional documents to be associated with or included in the StateFile by uploading these documents via a user interface, and these documents may be included in the StateFile database via the platform. These documents may include proof of wages, instructions or benefits information, etc. In one aspect, these documents may be combined with the associated StateFile into a Public Access File (PAF), which may be converted to display data, transmitted to local computers, and/or uploaded to a website or dedicated public display portal. The platform may receive view or modification requests from users in respect to the PAF. These requests may be approved or denied based on the user's UserClass.

In one embodiment, the platform will automatically prepare a report for a given StateFile based on a change of state, the time stamp in relation to a determined or calculated time stamp, or the state duration based on a set maximum. In another embodiment, the platform prepares a report upon request from a user with the appropriate UserClass permissions.

In one embodiment, the report may feature an LCA Number, a petitioner name identifier, a job title, a posting location including such details as the city and state of the open position(s), the number of positions, the state of the StateFile, the various time stamp(s), the various time duration(s), the date posted, the date removed, etc. In another embodiment, the report may include analytics comparing one StateFile to another set of StateFiles or all StateFiles, covering all StateFiles, and/or a set of StateFiles to a standard or representative StateFile. In particular, rates of various state designations, such as the rate of denial or withdrawal, average posting times or related statistics, etc., may be displayed. Statistics may be refined by location, industry, Customer, etc.

As pertinent to alternative embodiments, as part of the employment-based Green Card process, employers must first obtain a PERM labor certification from the US Department of Labor. Part of that process requires employers to satisfy mandatory recruitment activities, one of which is posting a Notice of Job Opportunity at that employer's in-house media. For companies that do not have that kind of media (e.g. an intranet), LaborLess can provide a PERM posting page similar to the LCA posting LaborLess currently built. There may be other PERM-related opportunities such as creating a more traditional job-posting feature, a recruiting board, etc.

Broader LaborLess applications include, but are not limited to, similar work visa posting requirements outside the U.S. as well as non-immigration related posting requirements such as Minimum Wage information, Work Safety information, other posting requirements promulgated by the US Department of Labor, and posting requirements promulgated by other federal agencies.

BRIEF DESCRIPTION OF THE DRAWINGS

FIG. 3 shows an exemplary user interface.

FIG. 4 shows an exemplary public-facing LCA Posting user interface.

FIG. 5 shows an exemplary user profile user interface.

FIG. 6 shows an exemplary user interface.

FIG. 7 shows an exemplary top half of the add petitioner screen.

FIG. 8 shows an exemplary bottom half of the add petitioner screen.

FIG. 19 shows a user interface enabling the designation of third party worksites.

DETAILED DESCRIPTION

Figure 1:
FIG. 1 shows an exemplary main dashboard.

FIG. 1 shows an exemplary main dashboard displaying to a user window of the status of their Active, Completed and Archived LCAs along with some important captured information and a set of actions including Edit, Post and Take Down.

Figure 2:
FIG. 2 shows an exemplary details page.

FIG. 2 shows an exemplary details page of an individual LCA posting, including important captured information as well as Files that can be individually viewed or together as part of corresponding Public Access File.

Figures 3, 4:
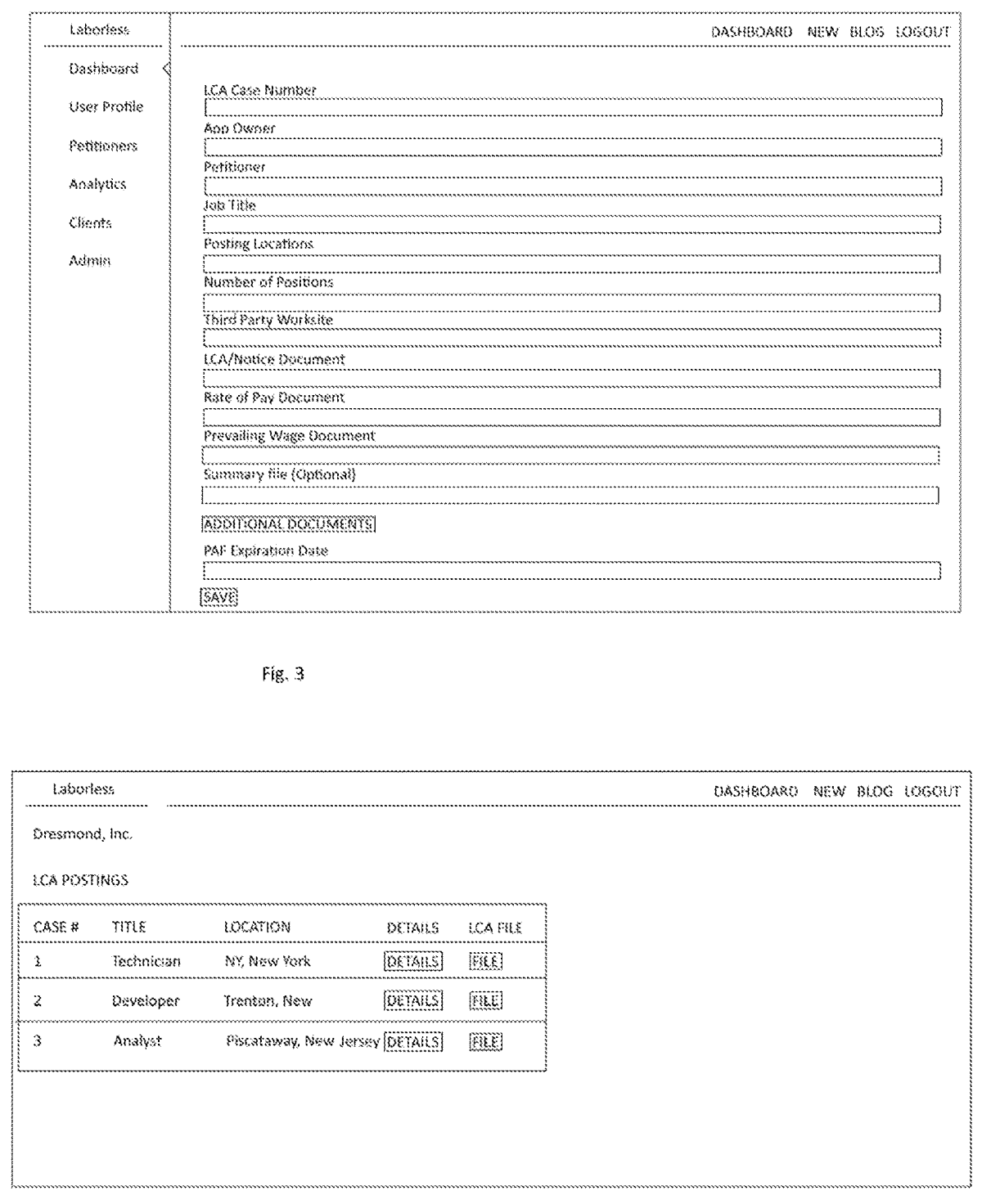

FIG. 3 shows an exemplary user interface allowing the user to create a new LCA posting and shows the data LaborLess captures as well as the Files that are uploaded with each LCA.

FIG. 4 shows an exemplary public-facing LCA Posting user interface that each Petitioner can access as a LaborLess user. It shows all the currently Live LCA Postings in accordance with Department of Labor posting regulations.

Figures 5, 6:
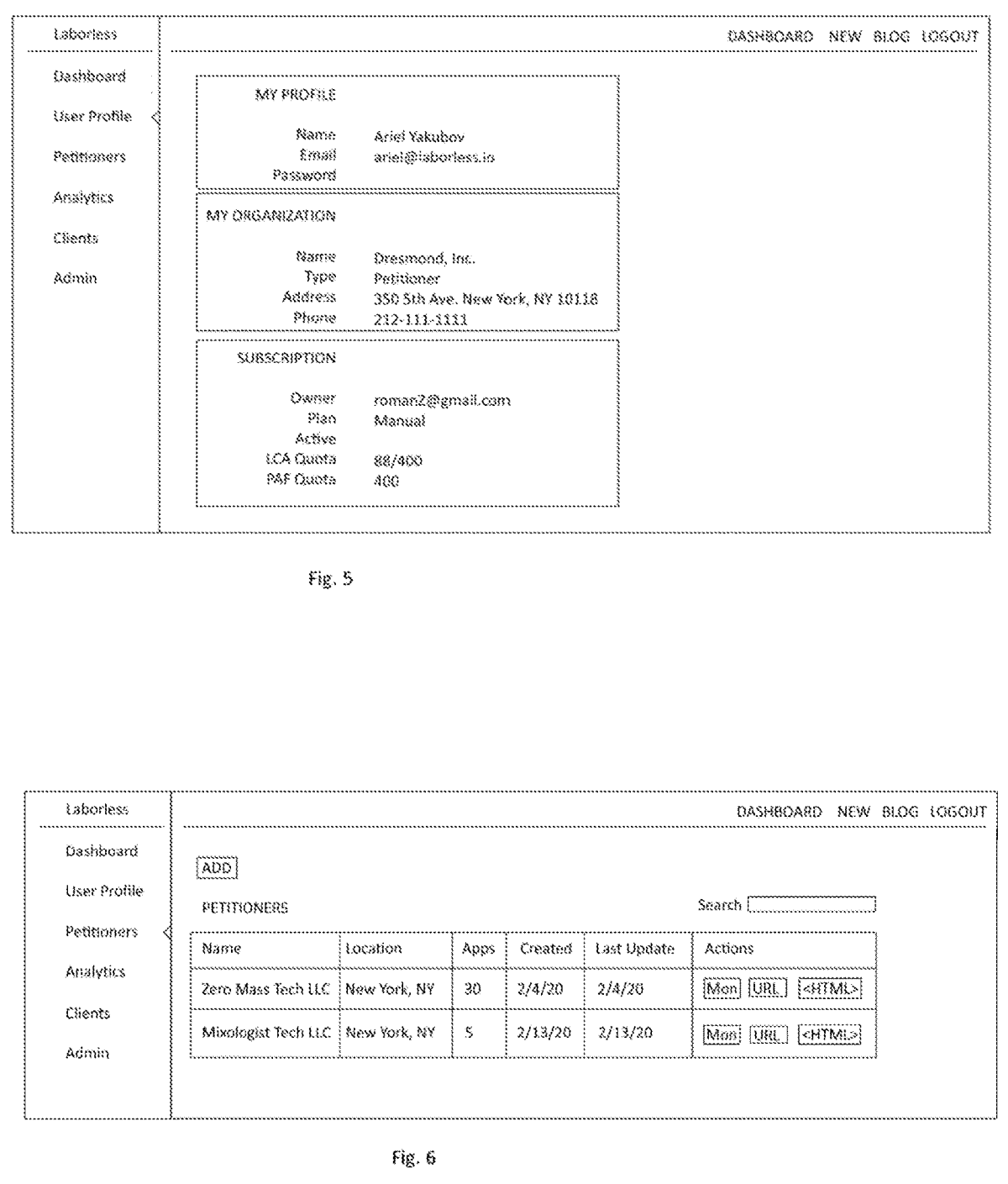

FIG. 5 shows an exemplary user profile user interface which displays the User's captured biographic information, the Petitioner's information (My Organization) and related subscription information.

FIG. 6 shows an exemplary user interface displaying the Petitioners that are registered under this LaborLess account. This is particularly relevant for accounts that might have multiple subsidiary legal entities that submit and therefore post LCAs under separate entity names, or for Law Firm Users who may be posting LCAs for multiple Petitioner clients.

Figures 7, 8:
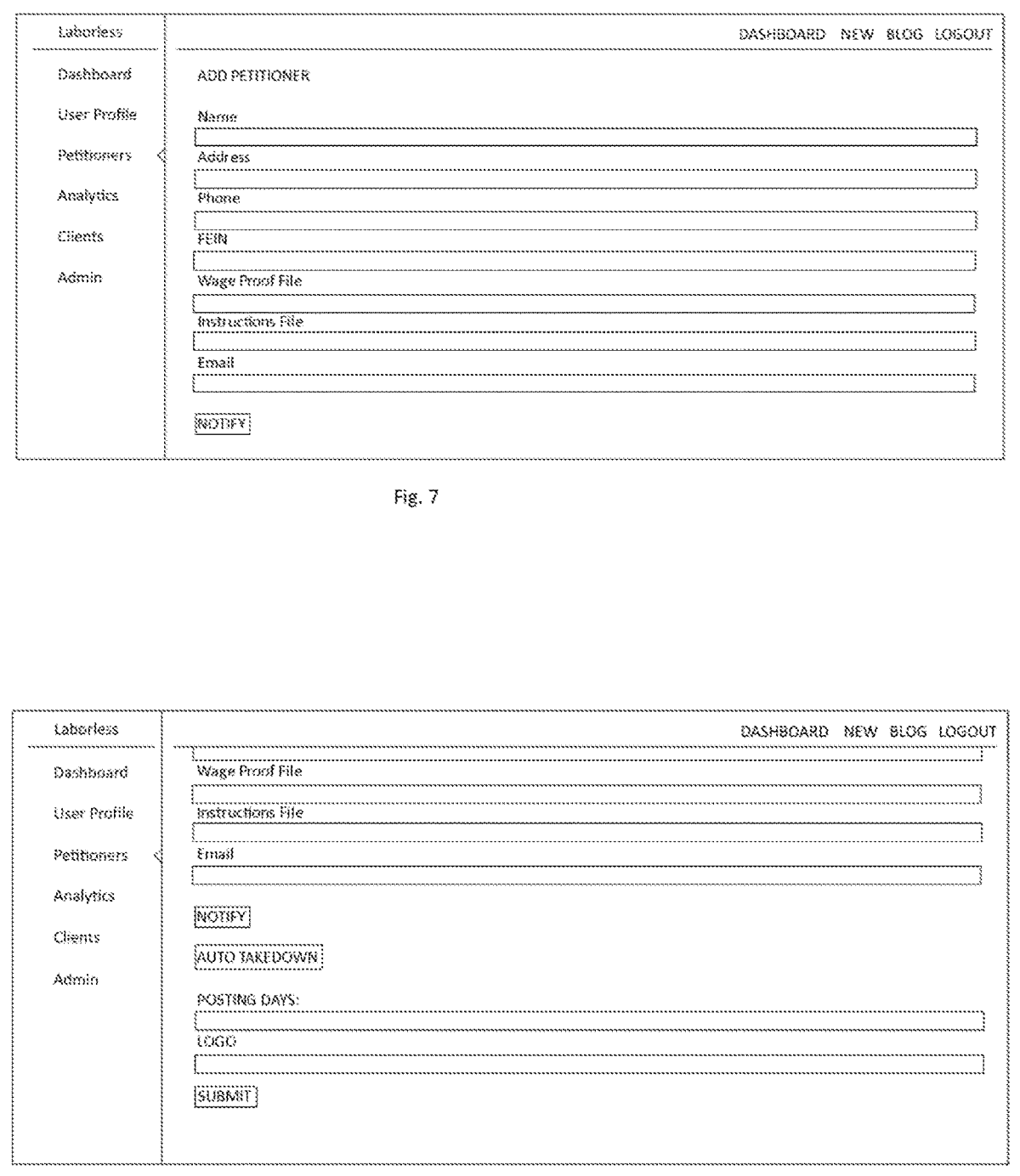

FIG. 7 shows an exemplary top half of the add petitioner screen, which allows Users to add Petitioners after registering for LaborLess—this is used both for the main Petitioner as well as for any subsidiary petitioners or multiple clients when used by a Law Firm.

FIG. 8 shows an exemplary bottom half of the add petitioner screen.

Figure 9:
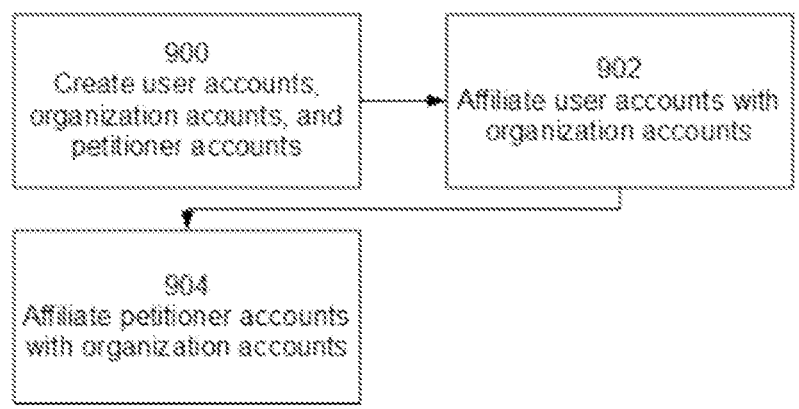
FIG. 9 shows an exemplary system process.

As shown in FIG. 9, the platform can create user accounts, organization accounts, and petitioner accounts 900, then affiliate the user accounts with the organization accounts 902 and then affiliate the petitioner accounts with the organization accounts 904.

Figure 10:
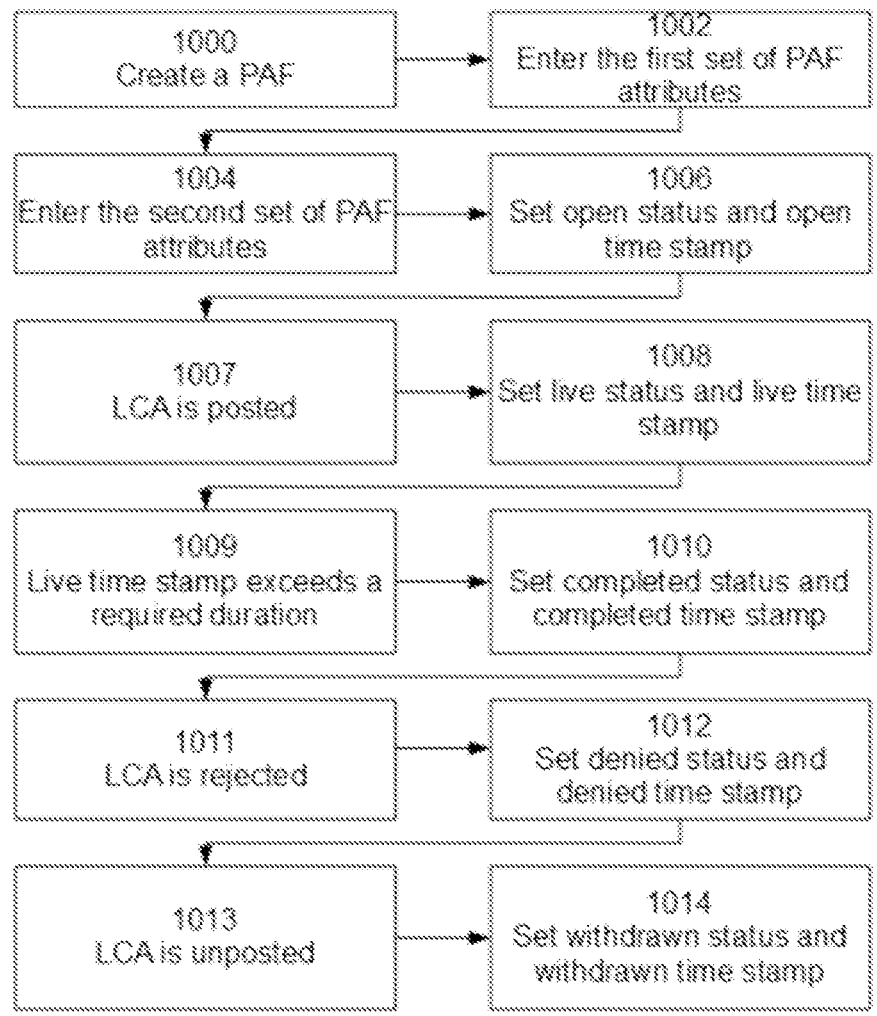
FIG. 10 shows an exemplary system process.

As shown in FIG. 10, a user can create a PAF 1000, then enter a first set of PAF attributes 1002, such as a job title, an organization identity and/or a petitioner identity, a geographical location and/or a client site, a case number, a salary, and an LCA, and upload additional documents. The system can then create a second set of PAF attributes 1004, including status, which may include an open status, live status, completed status, denied status, and withdrawn status, and status time stamps which may include an open time stamp, a live time stamp, a completed time stamp, a denied time stamp, and a withdrawn time stamp. The open status and the open time stamp may be set when a given PAF is created 1006, the live status and the live time stamp set 1008 when the given LCA is posted 1007, the completed status and the completed time stamp set when 1010 the live time stamp exceeds a required duration 1009, the denied status and the denied time stamp set 1012 when the given LCA is rejected 1011, and the withdrawn status and the withdrawn time stamp set 1014 when the given LCA is unposted 1013. The system may automatically unpost the LCA when the completed time stamp exceeds a user defined duration.

Figure 11:
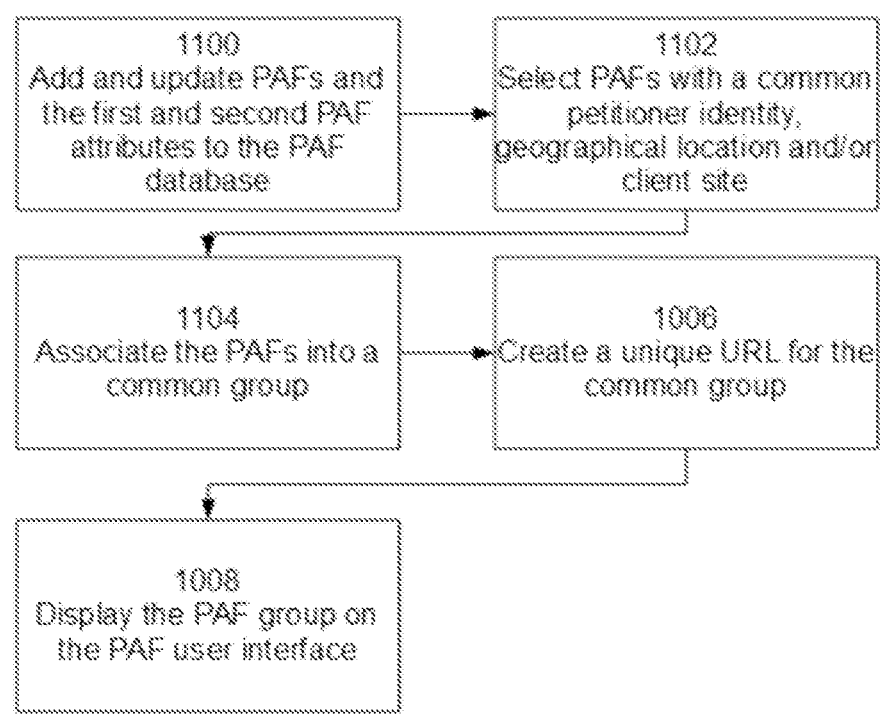
FIG. 11 shows an exemplary system process.

As shown in FIG. 11, the system may add and update PAFs and the first and second PAF attributes to the PAF database 1100, select PAFs with a common petitioner identity, geographical location, and/or client site 1102, associate them into a common group 1104, create a unique URL for the common group 1106, then display the PAF group on the PAF user interface 1108

Figure 12:
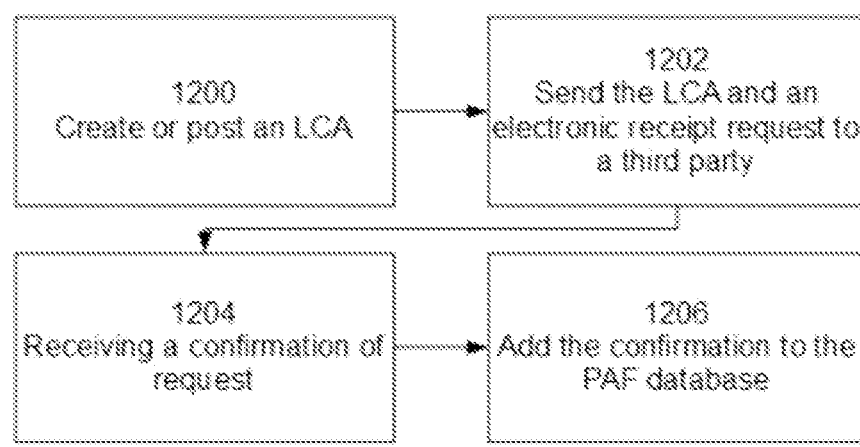
FIG. 12 shows an exemplary system process.

As shown in FIG. 12, upon creating or posting an LCA 1200, the system may send the LCA and an electronic receipt request to a third party 1202, then upon receiving a confirmation of receipt 1204, add the confirmation to the PAF database 1206.

Figure 13:
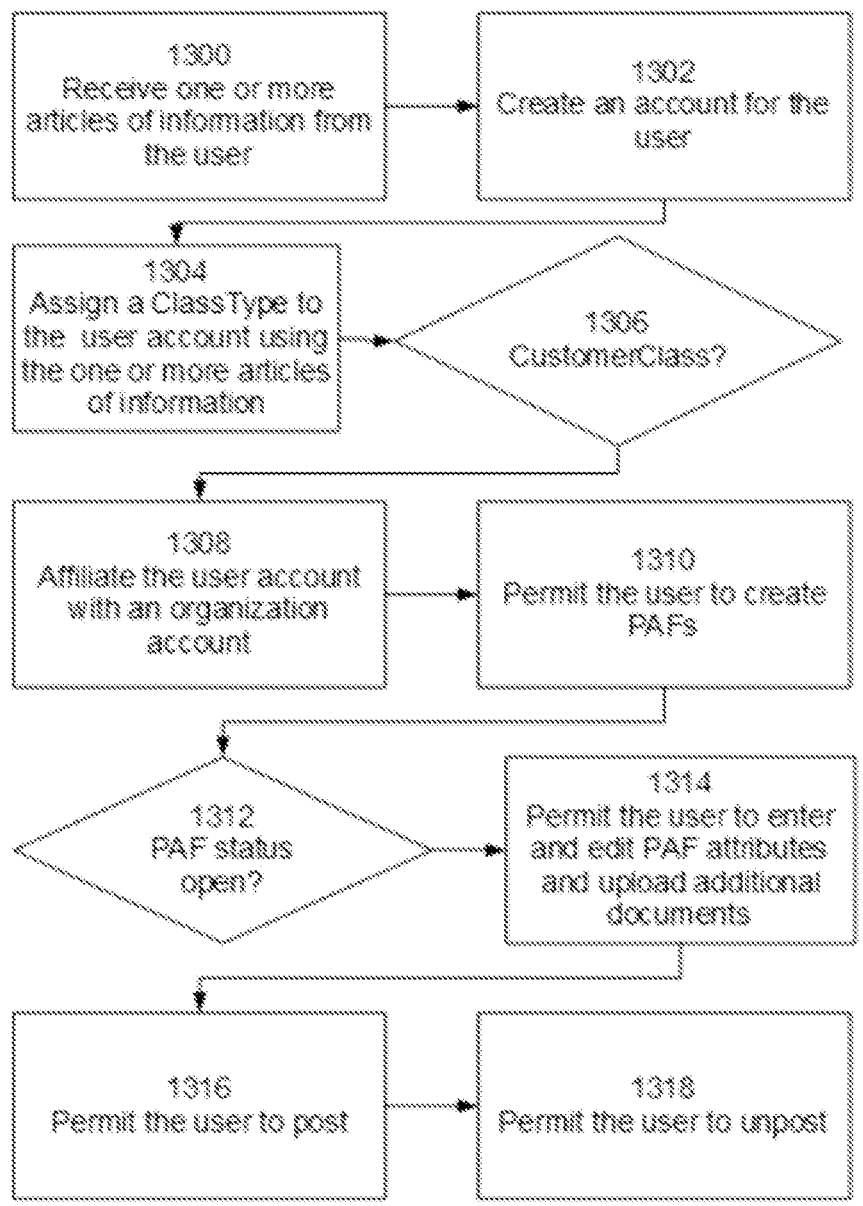
FIG. 13 shows an exemplary system process.

As shown in FIG. 13, the system may receive one or more articles of information from a first user, 1300, then create a first user account for the first user, 1302, then assign a ClassType to the first user account based on the one or more articles of information, 1304, with the ClassType selected from a set including AdministratorClass, StaffClass, CustomerClass, PetitionerClass, and AuditorClass. If the first user account is assigned the CustomerClass, 1306 affiliate the first user account with a first organization account, 1308 permit the first user to create PAFs 1310, then if PAF status is open and the PAF is associated with the first organization 1312, permit the user to enter or edit the first set of PAF attributes and upload the additional documents 1314, then permit the user to post 1316 and unpost LCAs 1318.

Figure 14:
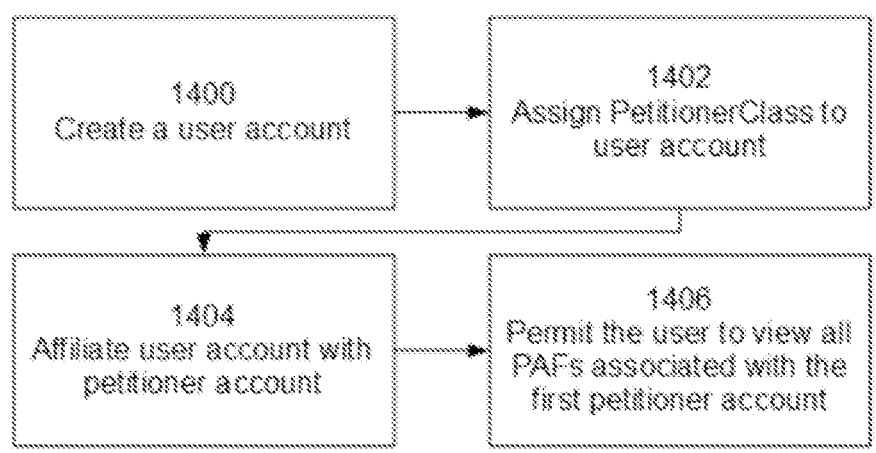
FIG. 14 shows an exemplary system process.

As shown in FIG. 14, the system may create a second user account for a second user 1400, assign the PetitionerClass to the second user account 1402, affiliate the second user account with a first petitioner account 1404, and then permit the second user to view all PAFs associated with the first petitioner account 1406.

Figure 15:
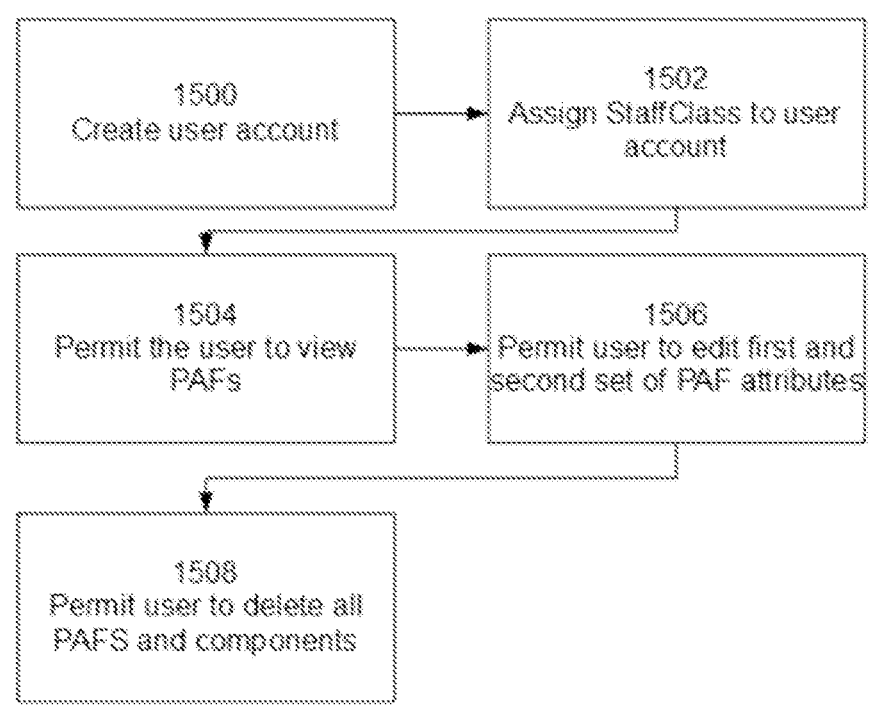
FIG. 15 shows an exemplary system process.

As shown in FIG. 15, the system may create a third user account for a third user 1500, assign the StaffClass to the third user account 1502, and permit the third user to view 1504, edit both the first and second set of PAF attributes 1506, and delete all PAFs and components thereof 1508 regardless of PAF status, organization affiliation, or petitioner affiliation.

Figure 16:
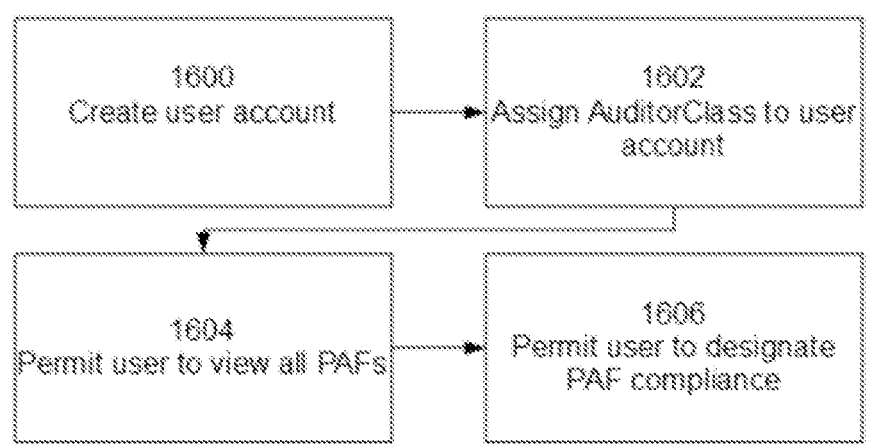
FIG. 16 shows an exemplary system process.

As shown in FIG. 16, the system may create a fourth user account for a fourth user 1600, assign the AuditorClass to the fourth user account 1602, and permit the fourth user to view all PAFs 1604 and designate PAF compliance 1606.

Figure 17:
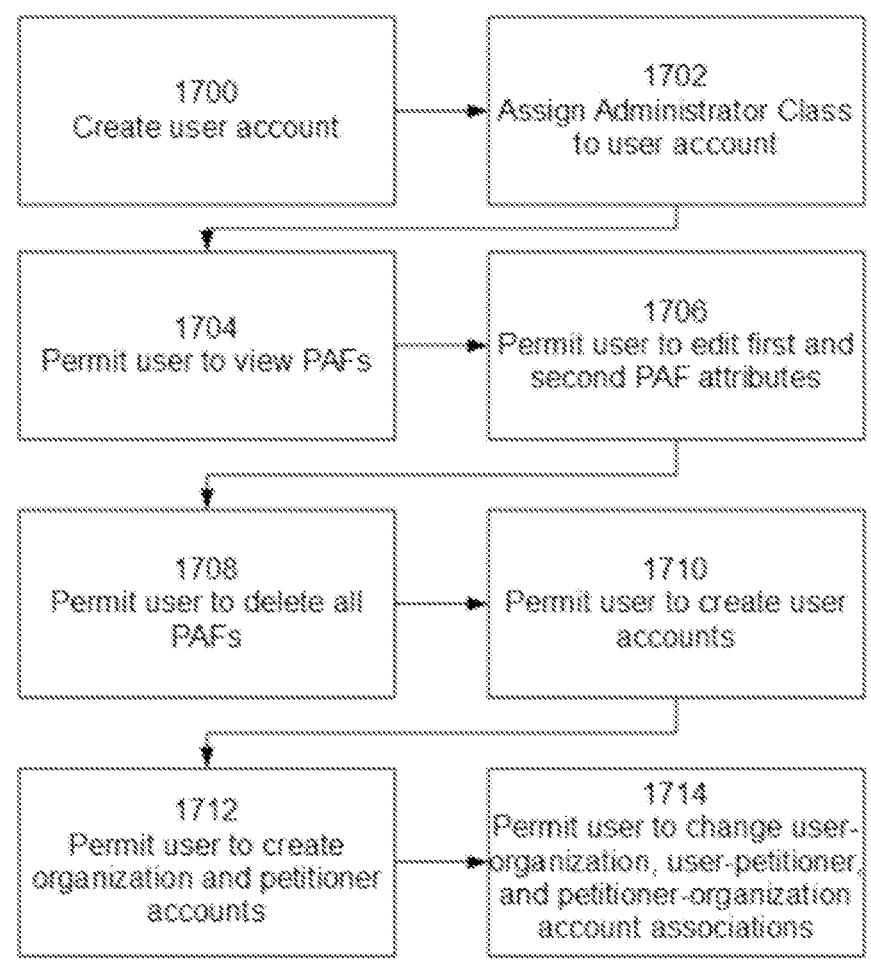
FIG. 17 shows an exemplary system process.

As shown in FIG. 17, the system may create a fifth user account for a fifth user 1700, assign the AdministratorClass to the fifth user account 1702, and permit the fifth user to view 1704, edit both the first and second set of PAF attributes 1706 and delete all PAFs 1708 regardless of PAF status, organization affiliation, or petitioner affiliation. The system may then permit the fifth user to create user accounts 1710, organization accounts, and petitioner accounts; modify ClassType for each user account 1712; and change user-organization, user-petitioner, and petitioner-organization account associations 1714.

Figure 18:
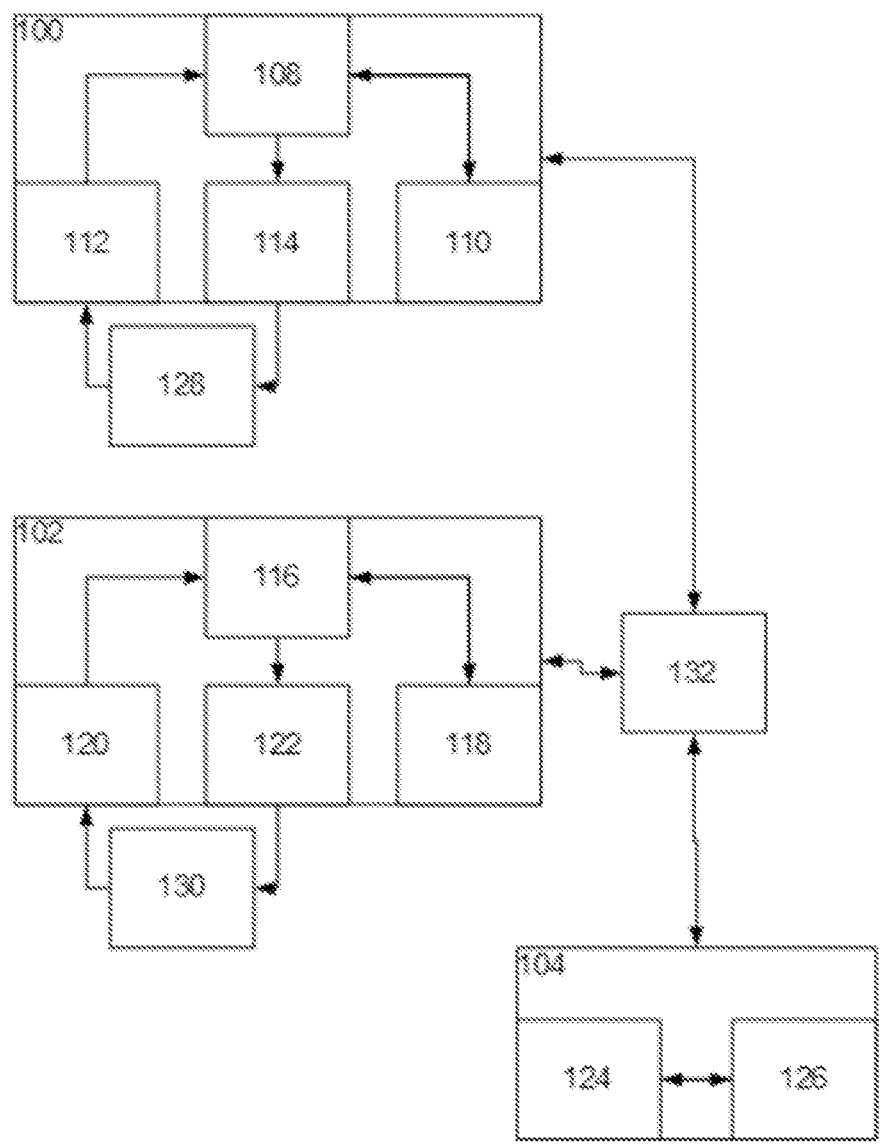
FIG. 18 shows an exemplary system architecture.

As shown in FIG. 18, the system may include a first computer system 102, a second computer system 104, and a third computer system 106, the first computer system comprising a first processor 108, a first computer storage memory 110, a first set of one or more input devices 112, and a first display device 114, the second computer system comprising a second processor 116, a second computer storage memory 118, a second set of one or more input devices 120, and a second display device 122, the third computer system comprising a third processor 124 and a third computer storage memory 126, the first computer system operated by a first user 128, the second computer system operated by a second user 130, the first computer system, the second computer system, and the third computer system connected to a network 132 of one or more computer systems. The first user may typically be a content providing user and the second user may typically be a viewing user, but the two roles are not mutually exclusive and may coexist in the same user. In one embodiment, an administrative user operating the third computer system may also be a content providing user.

Figure 19:
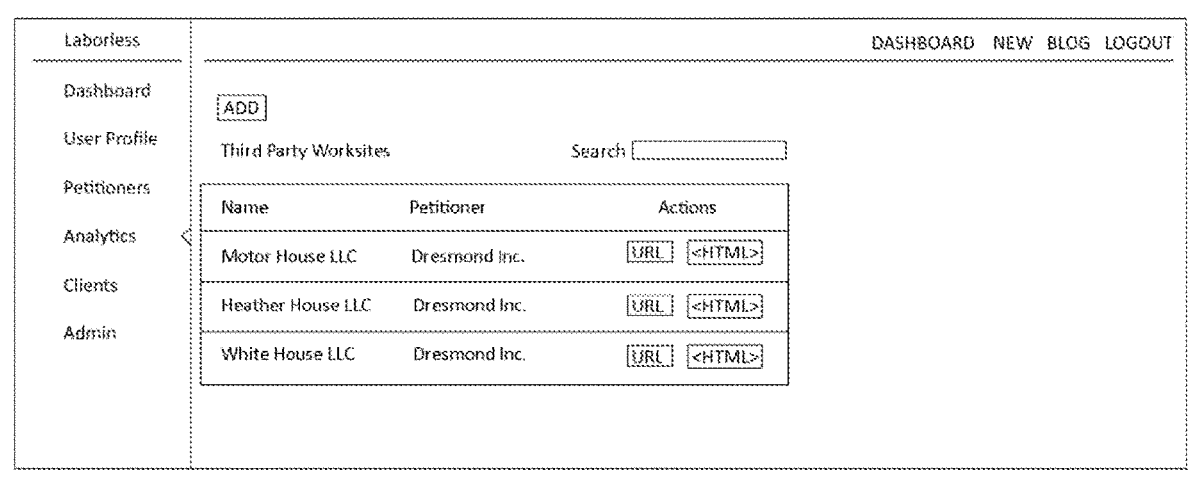

As shown in FIG. 19, the system may provide a user interface for the creation of third party worksites.

The invention claimed is:

1. A system comprising a public access file database and public access file user interface, a set of computer systems, each computer system comprising a computer-readable storage memory configured to store the public access file database, a processor configured to access and modify the public access file database, a display device configured to display the public access file user interface, and an input device, the set of computer systems being connected over a network and programmed to:

create public access files, where each public access file comprises a first set of public access file attributes, a second set of public access file attributes, and additional documents, with the second set including a status and status time stamps, the status designated from a set including live status, completed status, and denied status, the status time stamps including a live time stamp, a completed time stamp, and a denied time stamp, with the live status and the live time stamp set when a labor condition application is posted, the completed status and the completed time stamp set when the live time stamp exceeds a required duration, and the denied status and the denied time stamp set when the labor condition application is designated as rejected;

a. automatically unpost the labor condition application when the completed time stamp exceeds a user defined duration;

b. add and update public access files, the first and second public access file attributes, to the public access file database, then display public access file on the public access file user interface;

c. receive one or more articles of information from a first user, then create a first user account for the first user, and then assign a ClassType to the first user account based on the one or more articles of information, with the ClassType selected from a set including AdministratorClass, CustomerClass, and PetitionerClass or AuditorClass;

d. if the first user account is assigned the CustomerClass, affiliate the first user account with a first organization account, permit the first user to create public access files, enter or edit the first set of public access file attributes and upload the additional documents for all public access files associated with the first organization account, and post and unpost labor condition applications associated with the first organization account.

2. The system of claim 1, with the set of computers additionally programmed to:

a. create user accounts, organization accounts, and petitioner accounts, then affiliate the user accounts with the organization accounts and the petitioner accounts with the organization accounts.

3. The system of claim 1, with the first set of public access file attributes including a job title, an organization identity and/or a petitioner identity, a geographical location and/or a client site, a case number, a salary, and an labor condition application.

4. The system of claim 1, with the status designated from a set also including open status and the status time stamps also including an open time stamp, with the open status and the open time stamp set when a given public access file is created.

5. The system of claim 1, with the status designated from a set also including withdrawn status and the status time stamps also including a withdrawn time stamp, with the withdrawn status and the withdrawn time stamp set when the labor condition application is unposted.

6. The system of claim 3, with the public access files grouped in the public access file database by the organization and/or the petitioner identity, the geographical location and/or the client site, and with each public access file group having a unique URL.

7. The system of claim 1, with the set of computers additionally programmed to: upon creating or posting labor condition applications, send the labor condition applications and electronic receipt requests to third parties, then receive confirmations of receipt of the labor condition applications from the third parties, then add the confirmations to the public access file database.

8. The system of claim 1, with the set of computers additionally programmed to: create a second user account for a second user, assign the AuditorClass to the second user account, and permit the second user to view all public access files and designate public access file compliance.

9. The system of claim 1, with the set of computers additionally programmed to: create a second user account for a second user, assign the PetitionerClass to the second user account, affiliate the second user account with a first petitioner account, and permit the second user to view all public access files associated with the first petitioner account.

10. The system of claim 1, with the set of computers additionally programmed to: create a second user account for a second user, assign the StaffClass to the second user account, and permit the second user to view, edit both the first and second set of public access file attributes, and delete all public access files and components thereof regardless of public access file status, organization affiliation, or petitioner affiliation.

11. A system comprising a public access file database and public access file user interface, a set of computer systems, at least one computer system of the set of computer systems comprising a computer-readable storage memory configured to store the public access file database and a processor configured to access and modify the public access file database, the set of computer systems being connected over a network and programmed to:
  a. receive one or more articles of information from a user, create a user account for the user, and assign a ClassType to the user, with the ClassType selected from a set including CustomerClass;
  b. if the user account is assigned the CustomerClass, permit the user to create public access files, enter or edit the public access files, and post labor condition applications;
  c. where the labor condition application is posted by the system on an online display page;
  d. where each public access file comprises a first set of public access file attributes and a second set of public access file attributes, with the second set including a status and status time stamps, the status designated from a set including live status, completed status, denied status, and withdrawn status, the status time stamps including a live time stamp, a completed time stamp, and a withdrawn time stamp, with the live status and the live time stamp set when the labor condition application is posted, the completed status and the completed time stamp set when the live time stamp exceeds a required duration, and the withdrawn status and the withdrawn time stamp set when the labor condition application is unposted.

12. The system of claim 11, with the status designated from a set also including open status and the status time stamps also including an open time stamp, with the open status and the open time stamp set when a given public access file is created.

13. The system of claim 11, with the status designated from a set also including denied status and the status time stamps also including a denied time stamp, with the denied status and the denied time stamp set when the labor condition application is rejected.

14. The system of claim 11, with the first set of public access file attributes including a job title, an organization identity and/or a petitioner identity, a geographical location and/or a client site, a case number, a salary, and an labor condition application.

15. A system comprising an labor condition application database, an labor condition application user interface accessible over a network, one or more computer systems comprising one or more input devices, computer-readable storage memory, and one or more display screens, connected over the network and programmed to:
  a. display labor condition application attribute entry fields for a new labor condition application on the one or more display screens, then receive labor condition application attribute entries via the one or more input devices, then designate a labor condition application status for the new labor condition application as open, then save the labor condition application attributes and the labor condition application status to the labor condition application database;
  b. then receive a request from a user using a first computer system coupled to a first input device and a first display screen via the first input device to access the labor condition application user interface, then display the labor condition application user interface on the first display screen;
  c. then receive a request from the user via action tools to post the new labor condition application online; then designate the labor condition application status for the new labor condition application as live and record a live labor condition application time stamp, then update the labor condition application database with the updated labor condition application status and the live labor condition application time stamp, then display the new labor condition application online.

16. The system of claim 15, the set of computers additionally programmed to record an open labor condition application time stamp for the labor condition application status and save the open labor condition application time stamp to the labor condition application database.

17. The system of claim 15, the set of computers additionally programmed to determine which organization the user is associated with, then only if the new labor condition application is associated with the same organization, display the new labor condition application in conjunction with the action tools.

18. The system of claim 15, the set of computers additionally programmed to:
  if the live labor condition application time stamp equals or exceeds a set duration, change the labor condition application status to completed and update the labor condition application status for the new labor condition application in the labor condition application database.

19. The system in claim 15, the one or more computer systems programmed to provide the other users visual access to a group of labor condition applications via the labor condition application user interface and on a display page linked to a single URL, each labor condition application of the group of labor condition applications sharing a common petitioner source, with labor condition applications not in the group of labor condition applications not being displayed on the display page.

20. The system in claim 15, the one or more computer systems programmed to provide the other users visual access to a group of labor condition applications via the labor condition application user interface and on a display page linked to a single URL, each labor condition application of the group of labor condition applications sharing a common client site, with labor condition applications not in the group of labor condition applications not being displayed on the display page.

* * * * *